(12) United States Patent
Arlinsky

(10) Patent No.: US 6,697,721 B2
(45) Date of Patent: Feb. 24, 2004

(54) SAFETY DEVICES FOR USE IN MOTOR VEHICLES

(75) Inventor: David Arlinsky, Atlit (IL)

(73) Assignee: A.V.B.A. Engineers and Services (93) Ltd., Migdal Ha'emek (IL)

(*) Notice: Subject to any disclaimer, the term of this patent is extended or adjusted under 35 U.S.C. 154(b) by 0 days.

(21) Appl. No.: 10/310,179

(22) Filed: Dec. 5, 2002

(65) Prior Publication Data
US 2003/0074119 A1 Apr. 17, 2003

Related U.S. Application Data

(63) Continuation of application No. PCT/IL01/00522, filed on Jun. 7, 2001.

(51) Int. Cl.⁷ .............................................. B60R 16/00
(52) U.S. Cl. ............................. 701/36; 345/7; 345/9; 379/52
(58) Field of Search ............................. 701/36; 345/7, 345/9; 379/52

(56) References Cited

U.S. PATENT DOCUMENTS

| | | | |
|---|---|---|---|
| 4,787,040 A | * 11/1988 | Ames et al. ................ 701/1 |
| 4,818,048 A | 4/1989 | Moss | |
| 4,827,520 A | 5/1989 | Zeinstra | |
| 5,168,531 A | * 12/1992 | Sigel ...................... 382/291 |
| 5,555,502 A | 9/1996 | Opel | |
| 5,574,443 A | * 11/1996 | Hsieh ...................... 340/901 |
| 5,619,370 A | 4/1997 | Guinosso | |
| 5,767,842 A | * 6/1998 | Korth ...................... 345/168 |
| 5,784,036 A | 7/1998 | Higuchi et al. | |
| 5,923,267 A | * 7/1999 | Beuk et al. ............ 340/825.56 |
| 6,064,398 A | * 5/2000 | Ellenby et al. ............ 345/633 |
| 6,091,376 A | 7/2000 | Takekawa | |
| 6,222,447 B1 | * 4/2001 | Schofield et al. .......... 340/461 |
| 6,253,122 B1 | * 6/2001 | Razavi et al. ................ 701/1 |
| 6,346,929 B1 | * 2/2002 | Fukushima et al. .......... 345/8 |
| 6,373,472 B1 | * 4/2002 | Palalau et al. ............ 345/173 |
| 6,418,362 B1 | * 7/2002 | St. Pierre et al. .......... 701/36 |

FOREIGN PATENT DOCUMENTS

| | | | |
|---|---|---|---|
| DE | 19653595 C1 | 2/1998 | |
| EP | 0 682 281 A1 | 11/1995 | |
| EP | 813989 A1 | * 12/1997 | .......... B60K/37/06 |
| JP | 11321382 A | * 11/1999 | .......... B60K/35/00 |
| WO | WO 98/15964 | 4/1998 | |

* cited by examiner

Primary Examiner—Michael J. Zanelli
Assistant Examiner—Eric Gibson
(74) Attorney, Agent, or Firm—Nath & Associates PLLC; Harold L. Novick

(57) ABSTRACT

The present invention is directed toward head-up display based safety devices for use in motor vehicles. The first aspect of the present invention is directed towards facilitating accurate driver operation of a driver operable device deployable in a motor vehicle without the need for a driver to turn his eyes downwards toward its control panel. This can be achieved by either providing an icon representative of the position of a driver's fingertip positioned for operating the driver operable device for superimposition on a head-up display image of the layout of its control panel, or employing a speech recognition module to issue output control signals in accordance with spoken commands. The second aspect of the present invention is directed toward projecting a head-up display image of a driver's rear field of vision including wireframe images of objects located therein.

20 Claims, 9 Drawing Sheets

US 6,697,721 B2

SAFETY DEVICES FOR USE IN MOTOR VEHICLES

This application is a continuation application of International application number PCT/IL01/00522 filed Jun. 7, 2001 entitled SAFETY DEVICES FOR USE IN MOTOR VEHICLES, which designated the United States, the entire contents of which are hereby incorporated by reference in their entirety.

FIELD OF THE INVENTION

The invention in the field of safety devices for use in motor vehicles in general, and head-up display based safety devices for use in motor vehicles in particular.

BACKGROUND OF THE INVENTION

Considerable efforts have been invested over the years to facilitate safe operation of driver operable devices during driving of motor vehicles.
Exemplary prior art references include:

U.S. Pat. No. 4,827,520 illustrates and describes a voice actuated control system for use in a motor vehicle. The control system includes a voice processing circuit and memory for storing data representing command words employed to perform control functions for vehicle accessories and for detecting spoken command words and providing data corresponding thereto. The control system also includes a display and control panel to selectively provide visual prompts to the operator and a manual control.

U.S. Pat. No. 5,555,502 illustrates and describes a control system for assisting the driver of a motor vehicle in selectively adjusting the various electronics components present within his vehicle. The control system includes a control panel containing a plurality of selection keys for selecting an adjustable feature from any component in his vehicle, a tactile control for adjusting the selected feature, and an electronics display for displaying information relevant to his operation of the various components. The display may be a head-up display for projecting a head-up display image onto the windshield.

U.S. Pat. No. 5,784,036 illustrates and describes a head-up display arrangement having touch sensors on control switches mounted inside a vehicle whereby, on detection of a user contact on a control switch, the image of the control switch which the driver contacted is displayed in such a manner as to distinguish it from the images of its neighbouring control switches which he did not contact, thereby enabling him to distinguish which control switch he contacted without having to turn his eyes downwards from the forward direction of his moving vehicle.

Japanese Patent Laid-open Publication No. 07-307775 (U.S. Pat. No. 6,091,376) illustrates and describes the deployment of a touch panel on a front windshield duplicating the actual control panel of a mobile telephone handset to negate the need that a driver has to turn his eyes downwards away from the forward direction of his moving motor vehicle towards the control switches in order to locate the actual control switch that he wishes to depress.

SUMMARY OF THE INVENTION

The present invention is directed toward head-up display based safety devices for use in motor vehicles. The first aspect of the present invention is directed towards facilitating accurate driver operation of a driver operable device deployable in a motor vehicle without the need for a driver to turn his eyes downwards toward its control panel, thereby impeding his control over his motor vehicle. This can be achieved by either providing an icon representative of the position of a driver's fingertip positioned for operating a driver operable device for superimposition on a head-up display image of the layout of its control panels, or by employing a speech recognition module to issue output control signals in accordance with spoken commands, thereby simplifying their operation in comparison to their conventional operation. The second aspect of the present invention is directed toward projecting a head-up display image of a driver's rear field of vision including wireframe images of objects located therein.

BRIEF DESCRIPTION OF THE DRAWINGS

In order to understand the present invention and to see how it can be carried out in practice, preferred embodiments will now be described, by way of non-limiting examples only, with reference to the accompanying drawings, in which similar parts are likewise numbered, and in which.

DETAILED DESCRIPTION OF THE PREFERRED EMBODIMENT

Figure 1:
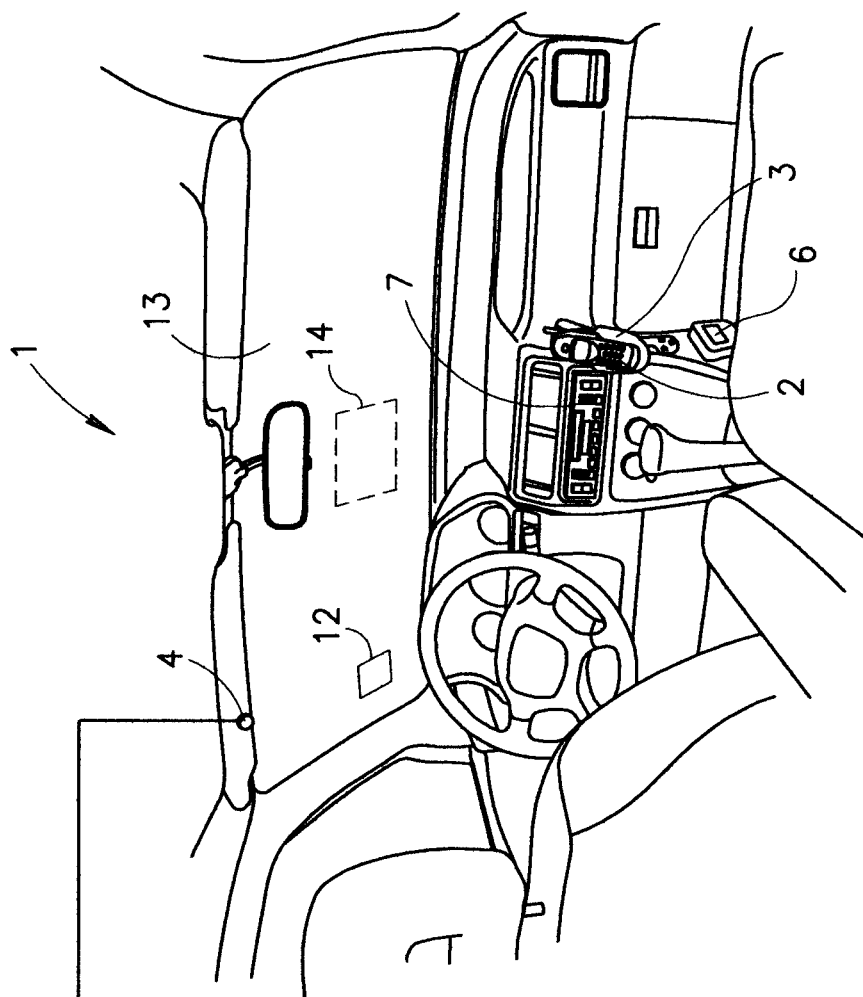
FIG. 1 is a pictorial representation of the interior of a motor vehicle fitted with a mobile telephone and a radio cassette player, and a schematic diagram of a safety device in accordance with one embodiment of the present invention for use during manual operation of the mobile telephone and the radio cassette player.
Figure 1:
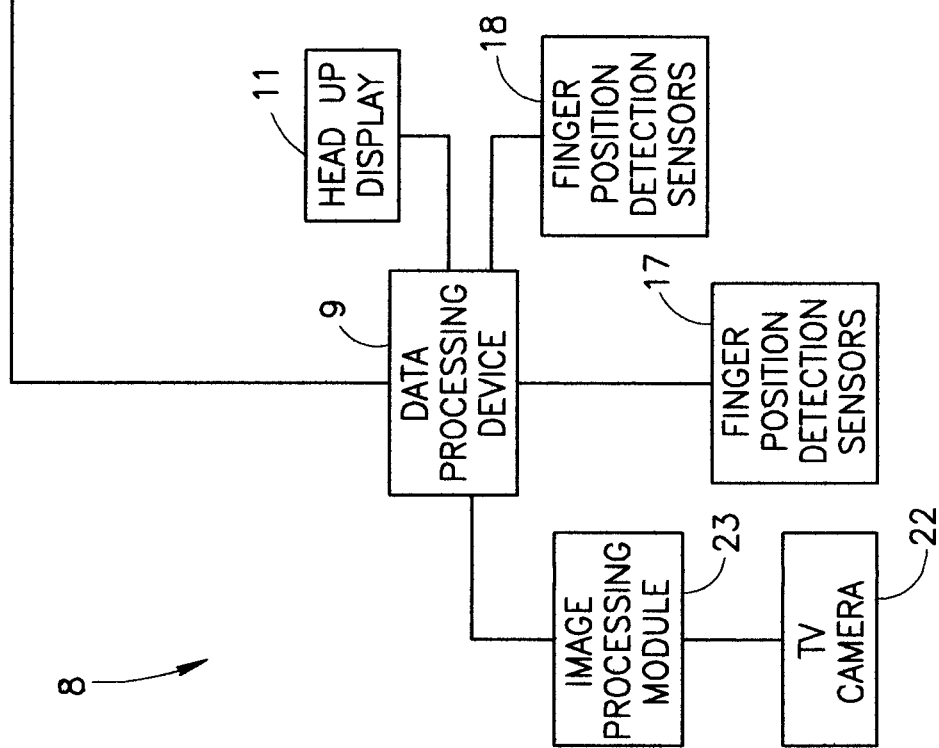
Figure 2:
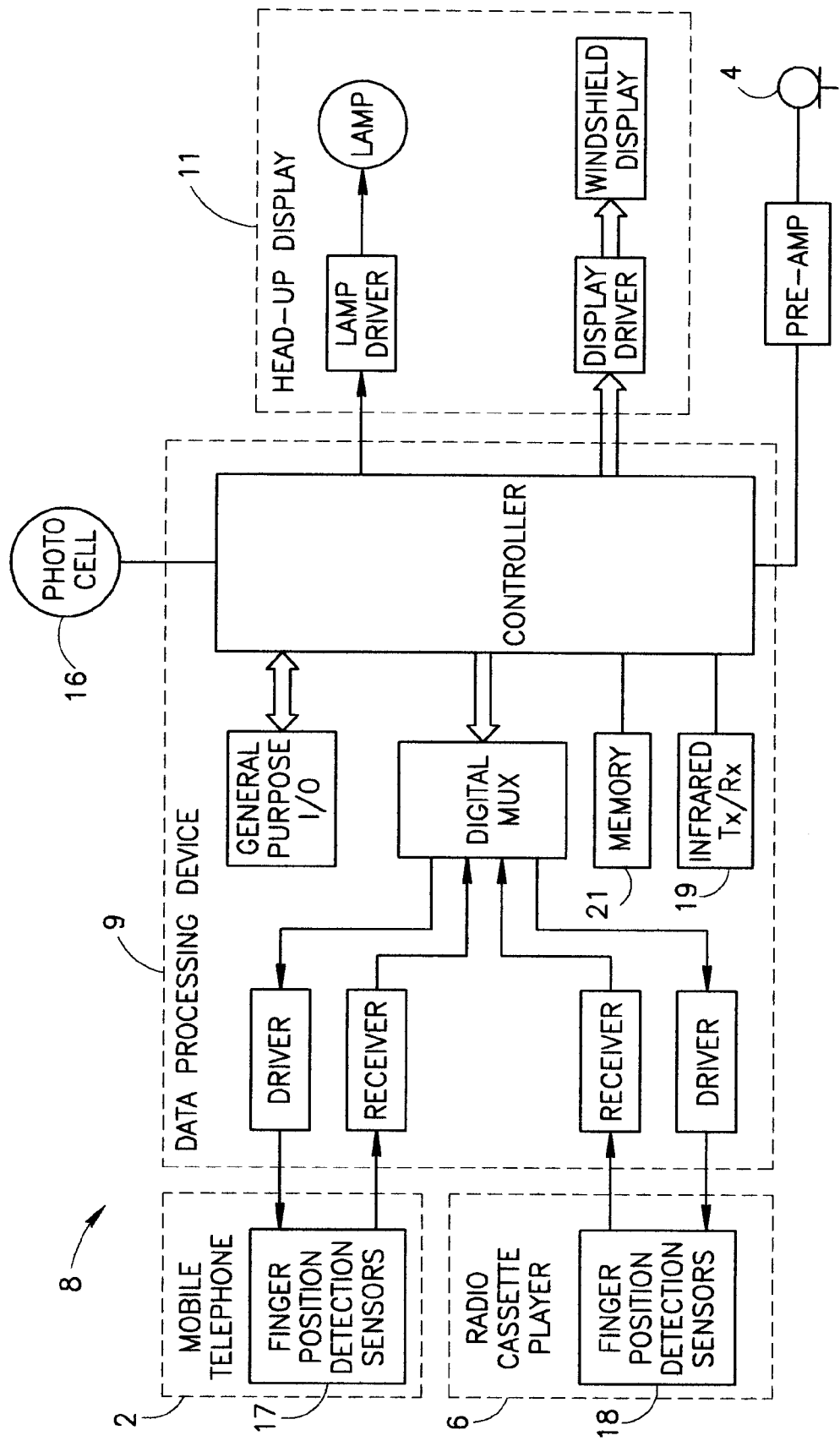
FIG. 2 is a block diagram of the safety device of FIG. 1.

FIG. 1 shows the interior of a motor vehicle 1 fitted with a mobile telephone 2 (constituting a driver operable device having a manually operable control panel, and a display window) residing in a cradle 3, and connected to an external microphone 4, and an external loudspeaker 6. The motor vehicle 1 is also fitted with a radio cassette player 7 (also constituting a driver operable device). The operation of both the mobile telephone 2 and the radio cassette player 7 is facilitated by a safety device 8 having a data processing device 9 for controlling a head-up display 11 for projecting an image on a combiner 12 mounted on the motor vehicle's front windshield 13 for displaying a head-up display image 14 which can be readily viewed by a driver driving the motor vehicle 1 without having to divert his gaze from his front field of vision. The brightness of the head-up display image 14 is adjusted in accordance with the prevailing light conditions as sensed by a photo cell 16 (see FIG. 2).

The data processing device 9 is connected to finger position detection sensors 17 (constituting icon positioning apparatus) deployed on the cradle 3 for continuously tracking the position of the fingertip of typically a driver's forefinger positioned to operate the mobile telephone 2 for automatically displaying an icon representative of his fingertip on a head-up display image of a near exact replica of the mobile telephone's actual control panel on detection of his forefinger approaching same. Similarly, the data processing device 9 is connected to finger position detection sensors 18 deployed around the periphery of the radio cassette player 7 for automatically displaying an icon representative of his fingertip on a head-up display image of a near exact replica of the radio cassette's actual control panel on detection of his forefinger approaching same. The layout of the control panels of the various driver operable devices can be downloaded, for example, via an infrared port 19 from a CD, the Internet, and the like for storage in a memory 21 (see FIG. 2). Typical finger position detector sensors include inter alia electro-optical sensors, ultra sound sensors, and the like.

Rather than provisioning an icon positioning apparatus adjacent to each driver operable device whose manual operation is to be facilitated by way of the safety device 8, a single icon positioning apparatus can be employed for same purpose of continuously tracking a driver's fingertip for automatically displaying an icon representative thereof on a head-up display image of near exact replicas of their corresponding actual control panels on detection of his forefinger approaching same. Such an icon positioning apparatus could be implemented in the form of a TV camera deployed on the inside of the motor vehicle's roof and downwardly directed towards the motor vehicle's driver console.

In the case of the mobile telephone 2, since on the one hand, the position of the driver's fingertip is known, and, on the other hand, the depression of one of its pushbuttons can be detected by virtue of it issuing a beep or similar audible indication, the data processing device 9 can also determine which pushbuttons have been depressed by the driver for displaying at least the digits of a telephone number entered on the mobile telephone's control panel for display in the head-up display image 14.

The safety device 8 can also include a rear facing TV camera 22 (constituting an image acquisition apparatus) deployed for acquisitioning an image of the driver's rear field of vision for processing by an image processing module 23 for rendering wireframe images of objects located in the image of the driver's rear field of vision for inclusion in a head-up display image of the driver's rear field of vision. The image processing module 23 typically employs conventional image processing techniques for edge detection. The head-up display 11 preferably automatically displays the head-up display image of the driver's rear field of vision when the motor vehicle 1 is put into reverse gear.

Figure 3B:
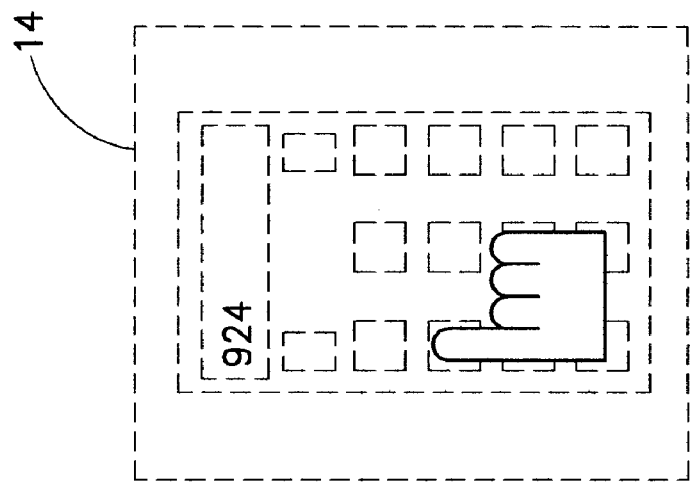
FIGS. 3A and 3B are schematic views depicting the operation of the safety device of FIG. 1 during manual operation of the mobile telephone.
Figure 3A:
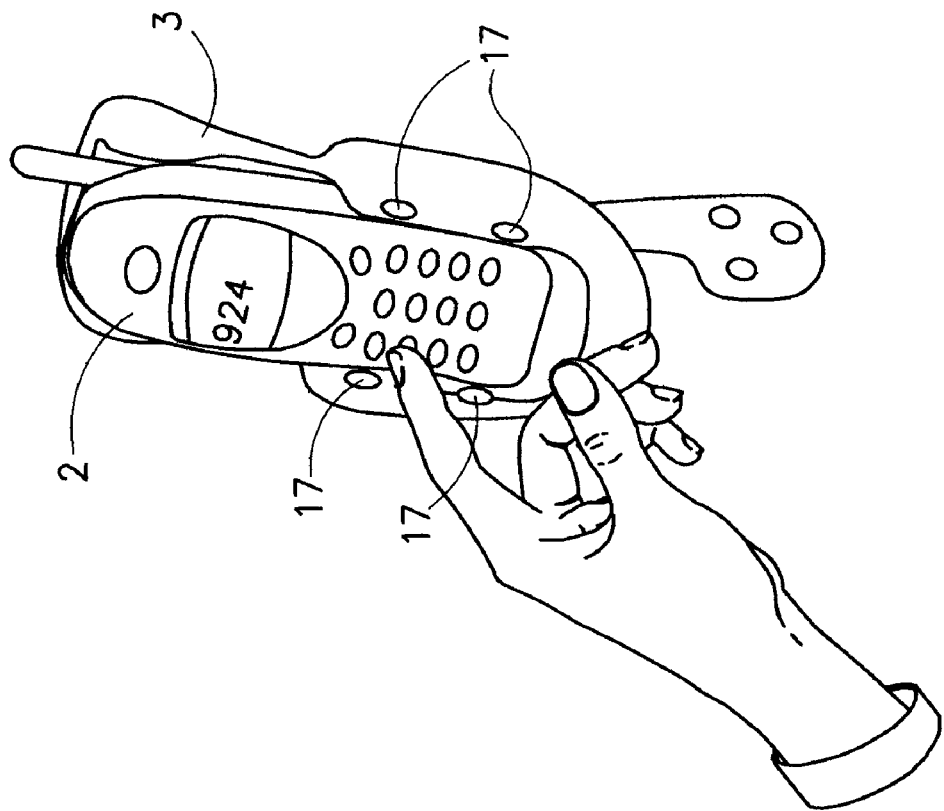
Figure 4B:
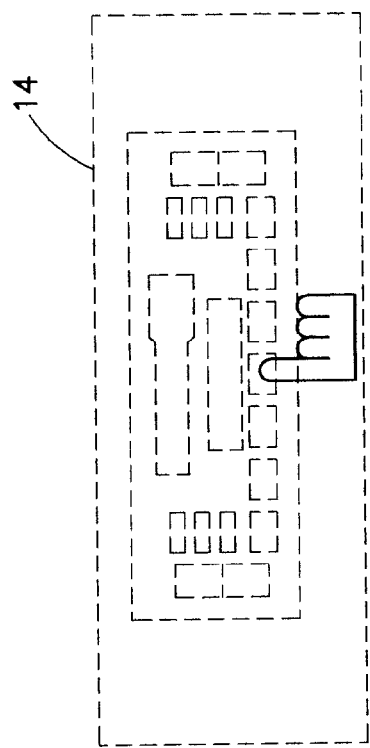
FIGS. 4A and 4B are schematic views depicting the operation of the safety device of FIG. 1 during manual operation of the radio of the radio cassette player.
Figure 5:
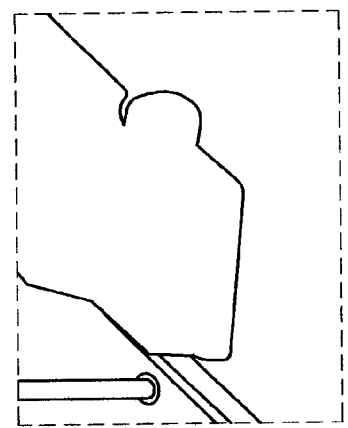
FIG. 5 is a schematic view depicting a head-up display image of a driver's rear field of vision including wireframe images of objects located therein.
Figure 4A:
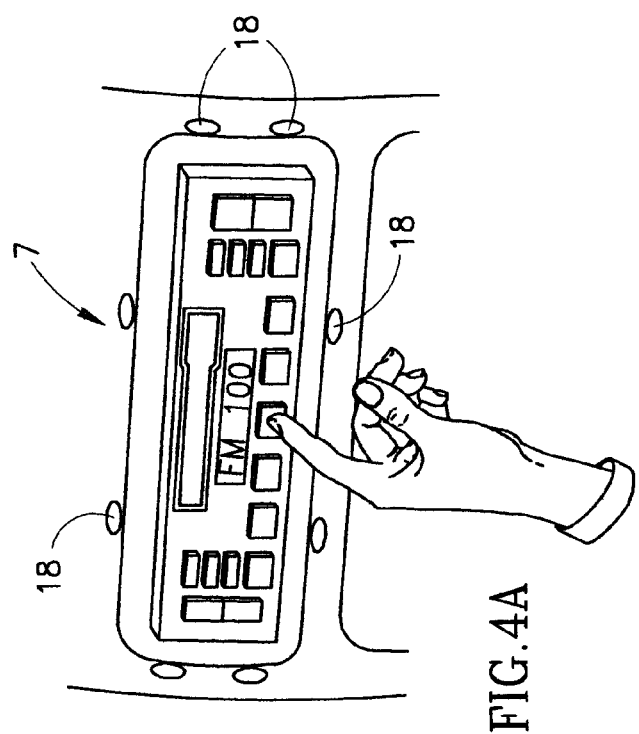

The operation of the safety device 8 is now described:

In the case that a driver wishes to safely make a telephone call while driving, he proceeds to start dialing the desired telephone number whereupon the position of his forefinger relative to the mobile telephone's control panel (see FIG. 3A) is continuously tracked on the head-up display image (see FIG. 3B) together with the dialed telephone number such that the driver can safely and accurately operate the mobile telephone without having to divert his gaze thereto-ward. The safety device operates in a similar fashion when the driver manually operates the radio or the cassette player of the radio cassette player except that in this case the head up display image does not display the information displayed in its display window (see FIGS. 4A and 4B). On putting his motor vehicle into reverse gear, the data processing device displays a head-up display image of the driver's rear field of vision including wireframes of any objects located therein, for example, a sidewalk, a lamppost, and another parked motor vehicle such that the driver can safely reverse his motor vehicle (see FIG. 5).

Figure 6:
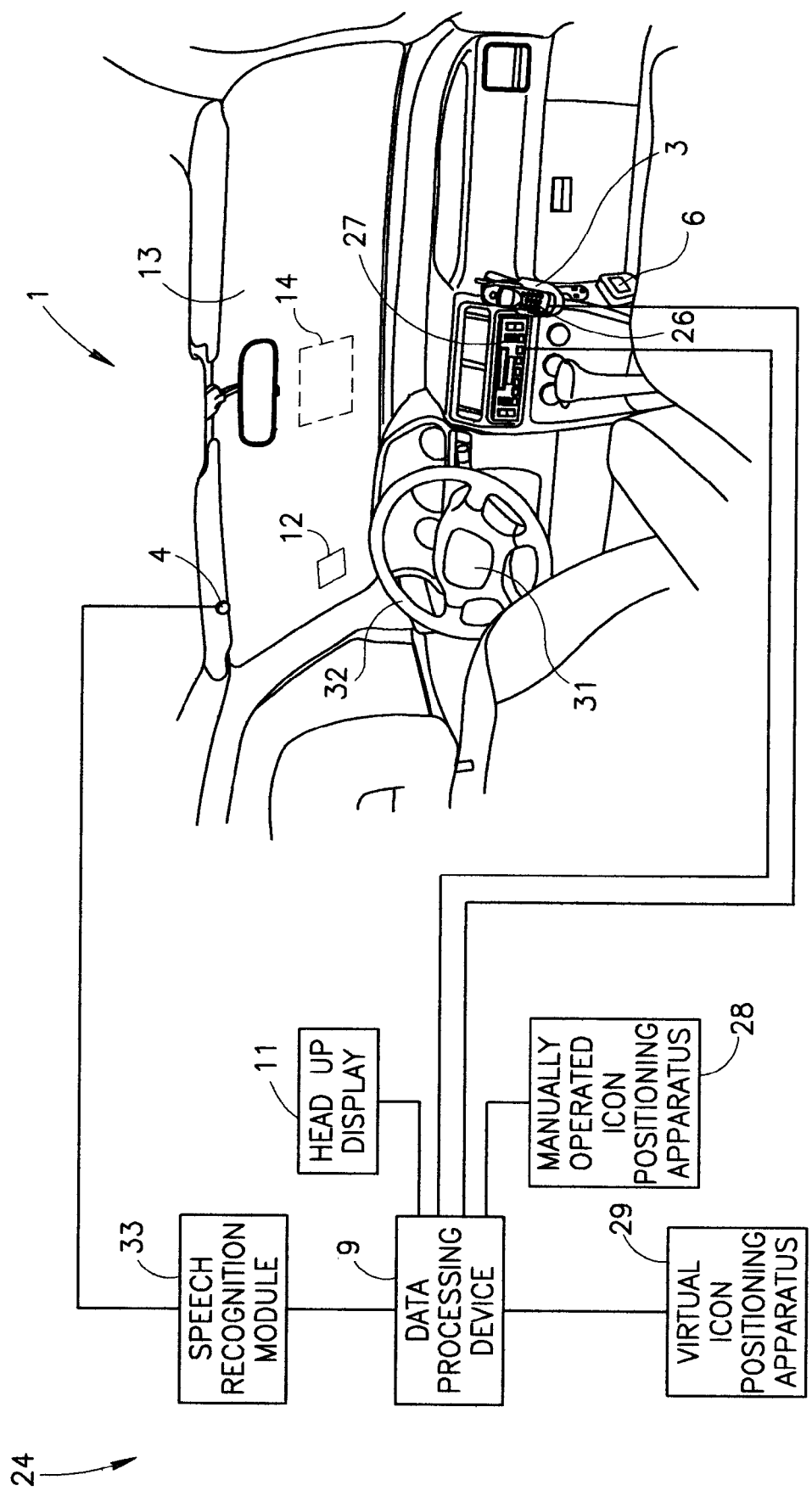
FIG. 6 is a pictorial representation of the interior of a motor vehicle fitted with a mobile telephone and an in-car audio player, and a schematic diagram of a safety device in accordance with another embodiment of the present invention for use during remote operation of the mobile telephone and the in-car audio center.

FIG. 6 shows a safety device 24 similar to the safety device 8 except that it is suitable for remote operation of driver operable devices having data input capabilities, for example, a mobile telephone 26, an in-car audio center 27 combining a radio, a cassette player, and a CD player, and the like. Remote operation of a driver operable device can be achieved by driver operation of a virtual control panel shown on the head-up display image 14 either from a manually operated icon positioning apparatus 28 or a virtual icon positioning apparatus 29 both preferably operative from the hub 31 of the motor vehicle's steering wheel 32. Alternatively, remote operation of a driver operable device can be voice activated by using a speech recognition module 33 programmed to recognize a set of predetermined spoken commands. In the case that a driver operable device also has data output capabilities, the safety device 24 can also display the same information displayed in the device's display window in the head-up display image 14. Also, in the case that the mobile telephone 26 does not have a data output capability, at least a dialed telephone number can be displayed on the head-up display image 14 in the similar manner as described hereinabove with reference to the safety device 8 since remote actuation of a pushbutton also causes the issue of a beep or similar audible indication. Optionally, the safety device 24 can include the back sensing capability enabled by the TV camera 22 and the image processing module 23.

Figure 7:
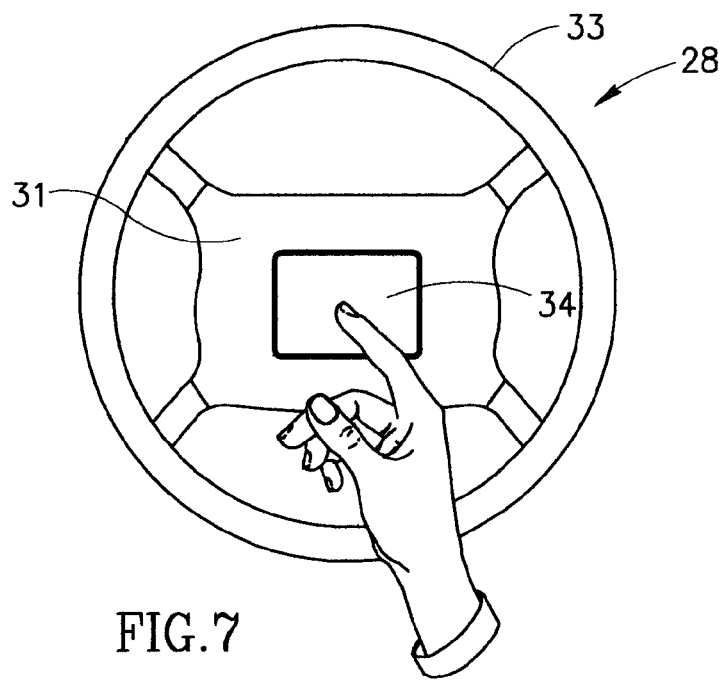
FIG. 7 is a schematic view of a manually operated icon positioning apparatus of the safety device of FIG. 6 operative from the motor vehicle's steering wheel.
Figure 8A:
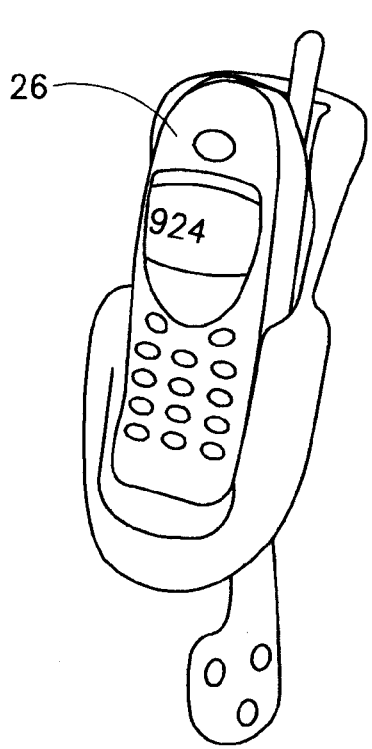
FIGS. 8A and 8B are schematic views depicting the operation of the safety device of FIG. 6 during remote operation of the mobile telephone.
Figure 8B:
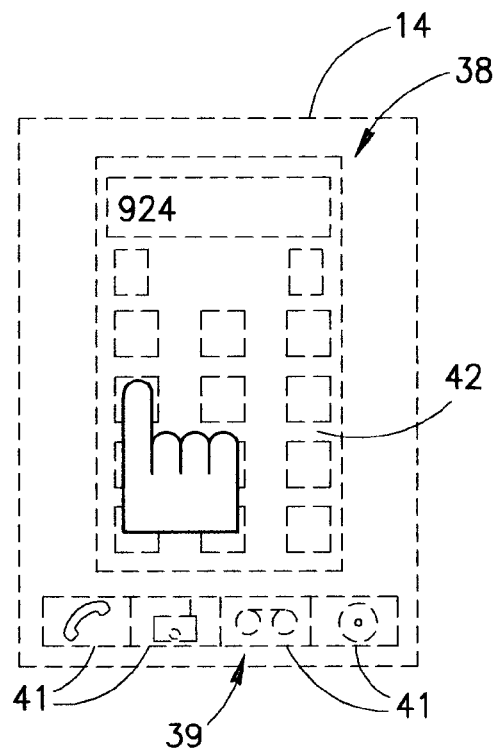

FIG. 7 shows that the manually operated icon positioning apparatus 28 can be implemented as a touchpad 34 similar to that deployed on laptop computers, PDAs, and the like, for operating a virtual control panel displayed on the head-up display image 14. The touchpad 34 is sensitive to both a driver tracing his figure on its surface for effecting displacement of the icon representative of his finger, and also his tapping his finger on its surface being the equivalent of his depressing a left touchpad pushbutton. Alternatively the manually operated icon positioning apparatus 28 can constituted by a trackball, and left and right mouse buttons. The manually operated icon positioning apparatus 28 is employed for operating a Windows-like desktop 38 having a lower selection bar 39 having a plurality of driver selectable fields 41 for selecting a virtual component control panel 42 each dedicated for the operation of either the mobile telephone 26, or one of the components of the in-car audio center 27. The safety device 24 displays an icon representative of the fingertip of typically a driver's forefinger superimposed on the head-up display image 14 of the selection bar 41 and/or the virtual component control panel 42 in a similar manner to the safety device 8 (see FIGS. 8A and 8B).

Figure 9:
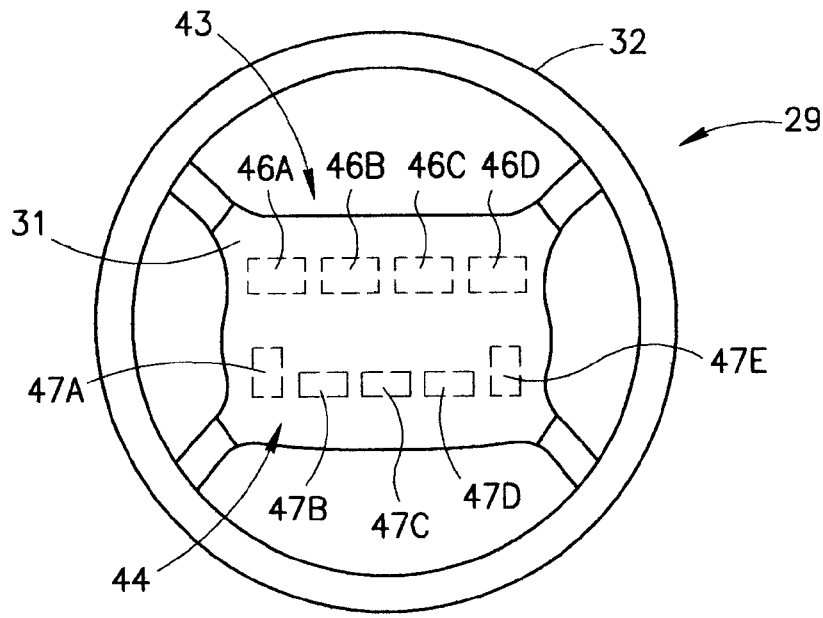
FIG. 9 is a schematic view depicting a virtual icon positioning apparatus of the safety device of FIG. 6 operative from the motor vehicle's steering wheel.
Figure 10:
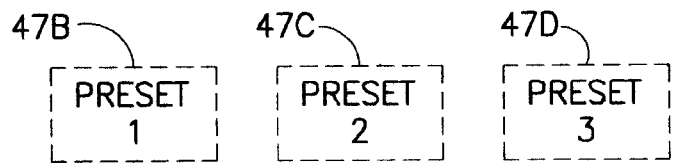
FIG. 10 is a schematic view depicting a portion of the virtual component control panel of the virtual icon positioning apparatus for remote operation of the radio of the in-car audio center.
Figure 11:
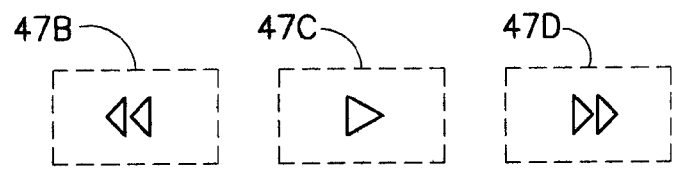
FIG. 11 is a schematic view depicting a portion of the virtual component control panel of the virtual icon positioning apparatus for remote operation of the cassette player of the in-car audio center.
Figure 12:
FIG. 12 is a schematic view depicting a portion of the virtual component control panel of the virtual icon positioning apparatus for remote operation of the CD player of the in-car audio center.
Figure 13A:
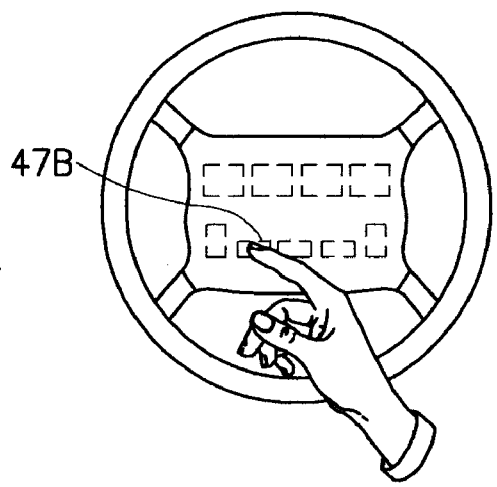
FIGS. 13A, 13B and 13C are schematic views depicting the operation of the safety device during remote operation of the radio of the in-car audio center.
Figure 13B:
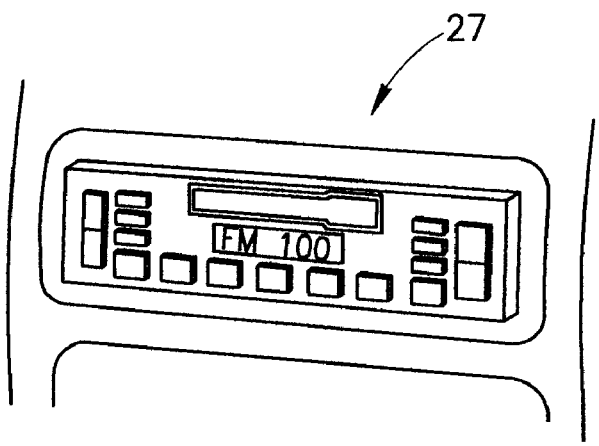
Figure 13C:
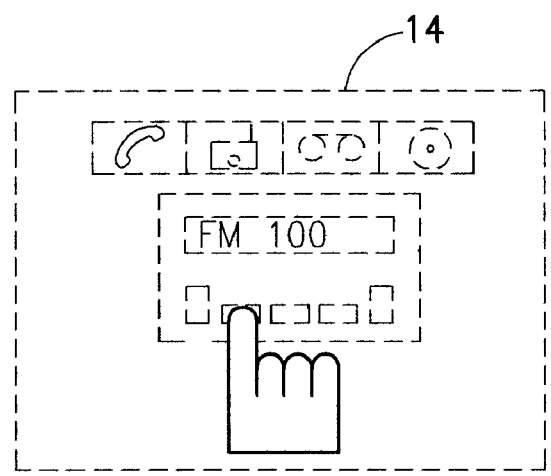

FIG. 9 shows the virtual icon positioning apparatus 29 operative from the steering wheel's hub 31 by finger contact thereon detectable by a TV camera deployed on the inside of the motor vehicle's roof and downwardly directed towards the motor vehicle's driver console. The virtual icon positioning apparatus 29 is effectively divided into two portions: a virtual selection panel 43 comparable to the virtual selection bar 41, and a virtual component control panel 44 comparable to the virtual component control panel 42. The virtual selection panel 43 can include a virtual selection pushbutton 46A for selecting remote operation of the mobile telephone 26, and virtual selection pushbuttons 46B, 46C and 46D for selecting remote operation of the radio, the cassette player and the CD player of the in-car audio center 27, respectively. The virtual component control panel 44 is employed for the actual driver remote operation, and is preferably has the same layout for each of the components of the in-car audio center 27. Furthermore, the leftmost and rightmost virtual pushbuttons 47A and 47E preferably have the same function for all the components of the in-car audio center 27, namely, an ON/OFF pushbutton and a VOLUME control, respectively. During remote operation of the radio, the three middle virtual pushbuttons 47B, 47C and 47D operate as PRESET controls for tuning the radio in a similar manner to its actual preset pushbuttons (see FIG. 10). During remote operation of the cassette player, the three middle virtual pushbuttons 47B, 47C and 47D operate as REWIND, PLAY and FORWARD PRESET controls (see FIG. 11). During remote operation of the CD player, the three middle virtual pushbuttons 47B, 47C and 47D operate to play the corresponding discs as stacked in the CD player (see FIG. 12). The operation of the safety device 24 having the virtual icon positioning apparatus 29 is similar to that having the manually operated icon positioning apparatus 28 as exemplified in FIGS. 13A, 13B and 13C for tuning the in-car audio center's radio to its first preprogrammed radio station FM 100 on the driver contacting the virtual pushbutton 47B. As shown in FIG. 13C, the in-car audio center 27 has a data output capability for displaying the same information as displayed on its display window on the head-up display image 14.

Figure 14B:
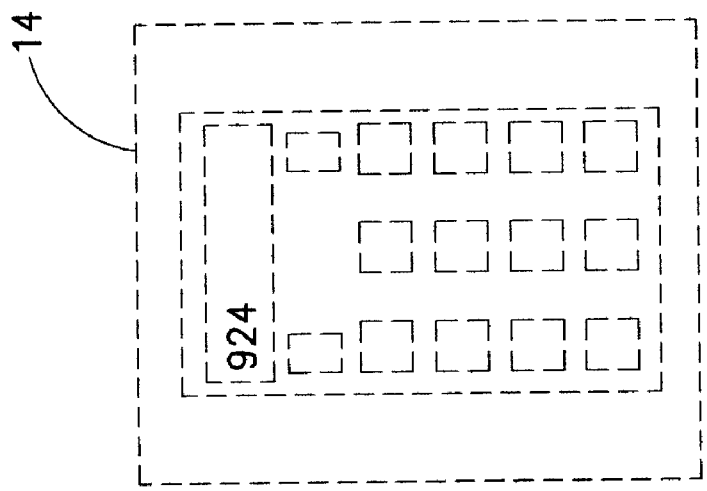
FIGS. 14A and 14B are schematic views depicting the operation of the safety device during voice activation of the mobile telephone.
Figure 14A:
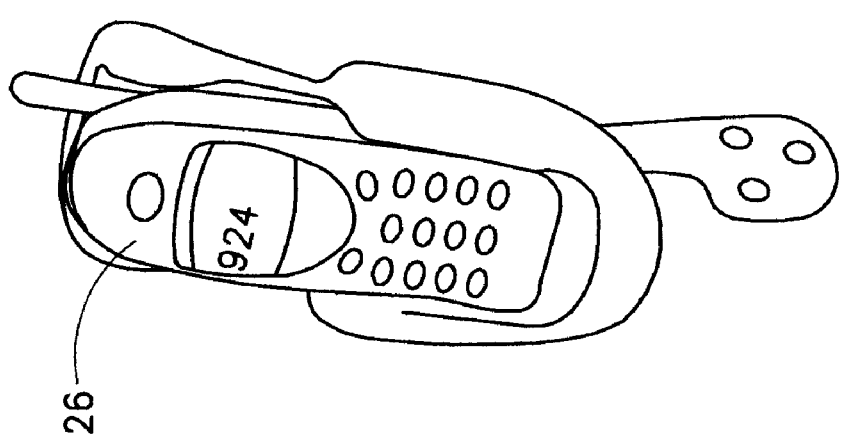

Alternatively, the driver can issue spoken commands to remotely operate the mobile telephone 26 or one of the components of the in-car audio center 27. For example, the spoken command "DIAL NUMBER" and then a recitation of digits, for example, "NINE, TWO, FOUR . . . ." would be the equivalent of consecutively depressing the pushbuttons 924 on the mobile telephone's actual control panel (see FIGS. 14A and 14B). Similarly, the spoken command "CD PLAYER" and "PLAY DISC TWO" could be programmed to start playing the second CD stacked in the CD player. In the case of voice activation of one of the driver operable devices, no icon representative of the position of the driver's finger would be displayed but the head-up display would preferably display the same information on the device's display window on the appropriate head-up display image.

While the invention has been described with respect to a limited number of embodiments, it will be appreciated that many variations, modifications, and other applications of the invention can be made within the scope of the appended claims. For example, in the same motor vehicle, one or more driver operable devices may be manually operated whilst one or more other driver operable devices may be remotely operated. Furthermore, the same driver operable device may be both manually and remotely operable for back-up reasons.

What is claimed is:

1. A safety device for use with at least one driver operable device deployable in a motor vehicle, said at least one driver operable device having a manually operable control panel, and a display window, the safety device comprising:
   (a) a memory for storing a graphical near exact replica image of a driver operable device's control panel;
   (b) a head-up display for projecting a head-up display image of said graphical near exact replica image; and
   (c) a plurality of finger position detection sensors deployed around at least a portion of the periphery of the driver operable device's control panel for continuously tracking the instantaneous position of a driver's fingertip with respect thereto for displaying a graphical icon representative of the position of the driver's fingertip with respect to the driver operable device's control panel on said graphical near exact replica image.

2. The safety device according to claim 1 wherein said head-up display image is automatically displayed on detection of the driver's fingertip in the vicinity of the driver operable device's control panel.

3. The safety device according to claim 1 wherein at the instant of an audible indication indicative of the actuation of a pushbutton of a mobile telephone, the digit corresponding to the position of the driver's fingertip is additionally displayed on said graphical near exact replica image.

4. The safety device according to claim 1 wherein the driver operable device has a data output capability whereby said head-up display image additionally displays the same information as displayed in the device's display window.

5. The safety device according to claim 1 and further comprising an image acquisition device for acquisitioning an image of the driver's rear field of vision, and an image processing module for rendering wireframe images of objects located in said image of the driver's rear field of vision and being connected to said data processing device for projecting a head-up display image of the driver's rear field of vision including said wireframe images.

6. The safety device according to claim 5 wherein said head-up display image of the driver's rear view of vision is automatically displayed when the motor vehicle is put into reverse gear.

7. A safety device for use with at least one driver operable device deployable in a motor vehicle, said at least one driver operable device having a manually operable control panel with a display window, and a data output capability, the safety device comprising:
   (a) a memory for storing a graphical near exact replica image of a driver operable device's control panel;
   (b) a head up display for projecting a head-up display image of said graphical near exact replica image with the same information as displayed in the device's display window; and (c) icon positioning apparatus for controlling the superimposition of a graphical icon representative of the position of a driver's fingertip for operating the driver operable device on said graphical near exact replica image.

8. The safety device according to claim 7 wherein said icon positioning apparatus includes a plurality of finger position detection sensors deployed around at least a portion of the periphery of the driver operable device's control panel for continuously tracking the instantaneous position of a driver's fingertip with respect thereto.

9. The safety device according to claim 8 wherein said head-up display image is automatically displayed on detection of the driver's fingertip in the vicinity of the driver operable device's control panel.

10. The safety device according to claim 8 wherein at the instant of an audible indication indicative of the actuation of a pushbutton of a mobile telephone, the digit corresponding to the position of the driver's fingertip is displayed on said graphical near exact replica image.

11. The safety device according to claim 7 wherein the driver operable device has a data input capability whereby it is driver operable from a virtual control panel.

12. The safety device according to claim 11 wherein said virtual control panel is driver operable from a manually operated icon positioning apparatus deployed in the motor vehicle's interior.

13. The safety device according to claim 11 wherein said virtual control panel is driver operable from a virtual icon positioning apparatus operable by contact of the driver's fingertip on the motor vehicle's steering wheel.

14. The safety device according to claim 11 wherein said virtual control panel includes at least two virtual selection controls for determining the driver operable device, or components thereof, to be remotely operated therefrom.

15. The safety device according to claim 11 wherein said virtual control panel includes the same layout of virtual pushbuttons for controlling two or more different driver operable device and/or components of one of the driver operable devices.

16. The safety device according to claim 7 wherein the driver operable device has a data input capability for enabling its remote operation from a speech recognition module providing an output control signal to the driver operable device corresponding to a spoken command.

17. The safety device according to claim 7 and further comprising an image acquisition device for acquisitioning an image of the driver's rear field of vision, and an image processing module for rendering wireframe images of objects located in said image of the driver's rear field of vision and being connected to said data processing device for projecting a head-up display image of the driver's rear field of vision including said wireframe images.

18. The safety device according to claim 17 wherein said head-up display image of the driver's rear view of vision is automatically displayed when the motor vehicle is put into reverse gear.

19. A safety device for use with a mobile telephone deployable in a motor vehicle, the mobile telephone having a control panel with an alphanumeric keypad for operating same and a display window for displaying information responsive to its operation, a data input capability for enabling remote driver operation, and a data output capability, the safety device comprising:

(a) a memory for storing a graphical image of a control panel including an alphanumeric keypad for operating the mobile telephone including the inputting of digits for their display on its display window;

(b) a head up display for projecting a head-up display image of said graphical image with the same information as displayed in the mobile telephone's display window; and (c) a manually operated icon positioning apparatus deployed in the motor vehicle's interior for continuously controlling the instantaneous position of a graphical icon on said graphical image for remotely operating the mobile telephone.

20. The safety device according to claim 19 wherein said graphical image is a near exact replica of the mobile telephone's control panel.

* * * * *

UNITED STATES PATENT AND TRADEMARK OFFICE
CERTIFICATE OF CORRECTION

PATENT NO. : 6,697,721 B2
DATED : February 24, 2004
INVENTOR(S) : Arlinsky

It is certified that error appears in the above-identified patent and that said Letters Patent is hereby corrected as shown below:

<u>Title page,</u>
Item [73], Assignees should read:
-- Assignee of undivided 50% interest: A.V.B.A. Engineers and Services (93) Ltd., Migdal, Ha'emek (IL) --

Signed and Sealed this

Seventeenth Day of August, 2004

JON W. DUDAS
*Acting Director of the United States Patent and Trademark Office*